United States Patent
Guillermo et al.

(10) Patent No.: US 7,194,690 B2
(45) Date of Patent: Mar. 20, 2007

(54) REMOTE SUPPORT FOR COMPUTER OR OTHER ELECTRONIC DEVICE

(75) Inventors: Amodeo Ojeda Guillermo, Largs (GB); Gavin Munro Cameron, Renfrewshire (GB); Colin David McCall, Glasgow (GB); David William Morton, Newlands Glasgow (GB); David Robert Skeen Rogers, Wemyss Bay Renfrewshire (GB); Andrew Wyllie, Tooting London (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 812 days.

(21) Appl. No.: 10/417,675

(22) Filed: Apr. 17, 2003

(65) Prior Publication Data

US 2004/0210658 A1 Oct. 21, 2004

(51) Int. Cl.
*G06F 15/00* (2006.01)
*G06F 13/00* (2006.01)
(52) U.S. Cl. .................................. 715/736; 709/227
(58) Field of Classification Search ................ 715/736, 715/737, 738, 749, 741, 751, 734; 709/223, 709/227
See application file for complete search history.

(56) References Cited

U.S. PATENT DOCUMENTS

| 5,771,039 | A | 6/1998 | Ditzik |
| 6,196,846 | B1 | 3/2001 | Berger et al. |
| 6,359,892 | B1* | 3/2002 | Szlam ................ 370/401 |
| 2002/0161895 | A1 | 10/2002 | Applah et al. |
| 2003/0009537 | A1* | 1/2003 | Wang ................ 709/219 |

* cited by examiner

*Primary Examiner*—Cao (Kevin) Nguyen
(74) *Attorney, Agent, or Firm*—Michael J. Medley; Driggs, Hogg & Fry Co., LPA (57) ABSTRACT

A technique for supporting a user of a first device coupled to a second device of a support agent. A current screen image of the first device is sent to the second device. The second device displays the current screen image of the first device. The agent device determines the position of an input icon to be displayed on the current screen image, and the position is sent to the first device. The first device displays an input icon on the current screen image on the first device based on the position. The second device also determines how the user should operate the input icon on the first device. Corresponding operation information is transferred to the first device.

1 Claim, 6 Drawing Sheets

REMOTE SUPPORT FOR COMPUTER OR OTHER ELECTRONIC DEVICE

FIELD OF THE INVENTION

The invention relates generally to remote, technical support for a user of a computer or other electronic device, and deals more particularly with such support provided by a support agent acting through another computer.

BACKGROUND OF THE INVENTION

Technical support is often required for users of a computer. This technical support may be to correct or diagnose a fault of an application running on the user's computer or to guide or educate the user in the use of an application running on the user's computer.

A variety of approaches currently exist to provide technical support. The most effective, but most costly approach is on-site support where a technical support agent visits the premises of the customer/user and works directly with the user on the user's computer. Another approach is for the user to call a help desk call center and speak to a technical support agent. The technical support agent will then explain to the user how to solve the problem or use the application. The primary disadvantage of this second approach is that the technical support agent is unable to see the display screens of the user's computer. Also, there may be language differences between the user and the technical support agent, or lack of familiarity of the user with the terminology spoken by the technical support agent.

Still another approach is to use a screen sharing application to enable the technical support agent to remotely view and manipulate the display screen of the user's computer. To begin this approach, the user telephones the technical support help desk and verbally logs a problem request. Once the user's problem request has been processed, the technical support agent may initially send the user an e-mail detailing the solution to the user's problem. If the problem is not resolved after this initial attempt, the technical support agent may need to see the user's display screen to solve the problem. If so, the user downloads and installs a screen sharing application if the user does not already have one. Next, the user launches the screen sharing application and sends the user's screen to the computer of the technical support agent. Once configured, the technical support agent is able to view the user's display screen. Then, the technical support agent can tell the user how to operate the problem application or take control of the user's screen and operate the problem application directly. There are several disadvantages of this approach. The user must have the capability to simultaneously operate the screen sharing application with a broad band connection and make a telephone call. Also, the user must make complex configuration settings for the screen sharing application. Also, some users may not want the technical support agent to control their computer.

Therefore, an object of the present invention is to provide an improved method and system to deliver technical support to remote users of computers.

SUMMARY OF THE INVENTION

The invention resides in a technique for supporting a user of a first device coupled to a second device of a support agent. A current screen image of the first device is sent to the second device. The second device displays the current screen image of the first device. The agent device determines the position of an input icon to be displayed on the current screen image, and the position is sent to the first device. The first device displays an input icon on the current screen image on the first device based on the position.

According to one feature of the present invention, the second device also determines how the user should operate the input icon on the first device. Corresponding operation information is transferred to the first device.

According to another feature of the present invention, a user of a device sends the user's screen image to a device of a technical support agent via a server. The technical support agent analyses the screen, and positions his or her cursor at a location to make the proper input selection with a mouse. Then, the technical support agent clicks the proper mouse button the proper number of times to make the proper input selection. The position of the cursor, the mouse button that was clicked and the number of clicks is recorded at the support agent's device. Then, the support agent sends this recorded information to the user device, and the user device displays an input icon (such as a mouse and cross hair cursor) superimposed on the user's screen at the location indicated by the recorded information. Then, the user makes the input selection recommended by the recorded information. After the user makes the input selection, the user's screen will be updated by the user's device in the normal manner. Then, the screen updates are sent to the support agent's device via the server. Next, the support agent repeats the foregoing operation by re-positioning the cursor, and clicking the proper mouse button the proper number of times. Then, the support agent sends the new input icon information to the user. This process is repeated until the user has successfully operated his or her application.

According to another feature of the present invention, the agent's device sends to the user's device along with the location of the input icon instructions on how to operate the input icon to input the proper selection to the user's screen. For example, if the input icon is a mouse and cross-hairs, the instructions may be which mouse button to click, and how many times to click it. According to another feature of the present invention, these instructions are incorporated into the input icon and in part, graphically represented.

According to another feature of the present invention, the server acts to interconnect the user device with the agent device, but does not participate directly in solving the user's problem.

DETAILED DESCRIPTION OF THE PRESENT INVENTION

Figure 1:
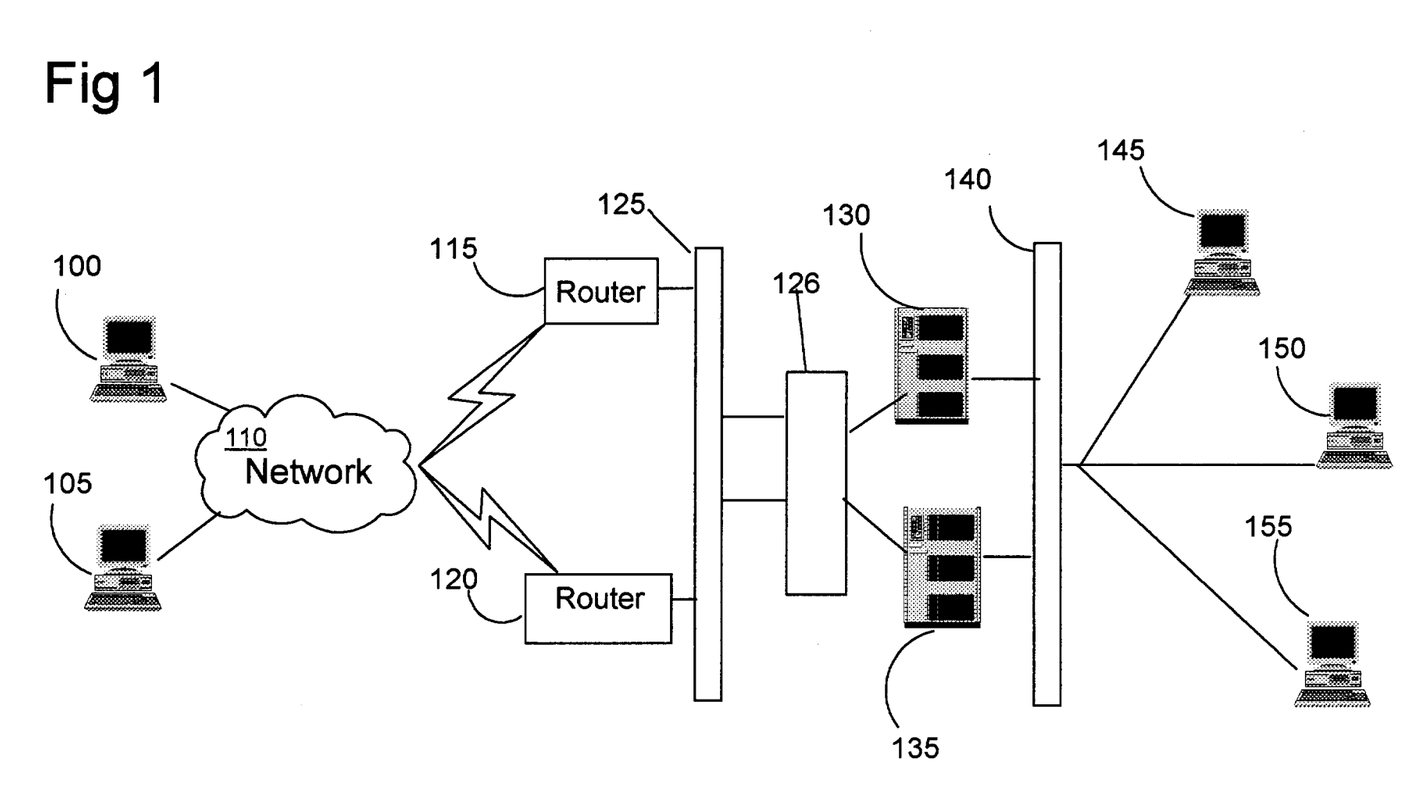
FIG. 1 illustrates a networked environment in which the present invention may be implemented.

FIG. 1 is a block diagram of a network embodying the present invention. User devices 100 and 105 are connected to a network 110 such as the Internet for remote communication. Routers 115 and 120 interconnect network 110 to a local area network (LAN) 125. The LAN connection can be a high speed Ethernet network or any other suitable transmission medium or topology. Servers 130 and 135 are interconnected and protected from LAN 125 by a router or firewall 126. Firewalls allow outgoing requests on specified ports (usually 80 and 443) and their corresponding replies. The servers allow two devices to hold a two way conversation by relaying traffic between them as they repeatedly send data and request updates via allowed ports. If desired, user devices 100 and 105 can also be connected directly to local area network (LAN) 125 as would be found inside a company's network infrastructure. User "devices" 100 and 105 can be various data processing, communication or electronic application devices such as desktop computers, laptop computers, PDAs, mobile phones etc. as found in any pervasive environment. By way of example, server 130 is a web server for the technical support system. Agent devices 145, 150 and 155 are also coupled to the servers 130 and 135 via agent device's firewall 140. Firewall 140 provides security and routing for agent devices 145, 150 and 155. Agent "devices" 145, 150 or 155 can be a variety of different devices such as desktop computers, laptop computers, PDAs, mobile phones, etc. as in any pervasive environment. Server 135 is "mutually trusted" by the user devices and the agent devices for managing a secure data communication service between the user devices and the agent devices. Servers 130 and 135 may implement one or more server operating systems including, for example UNIX operating system, Windows NT operating system, and/or a peer to peer networking arrangement. ("UNIX" is a registered trade mark of the Open Group in the United States and other countries. "Windows NT" is a registered trade mark of Microsoft Corporation in the United States and other countries.)

Figure 2:
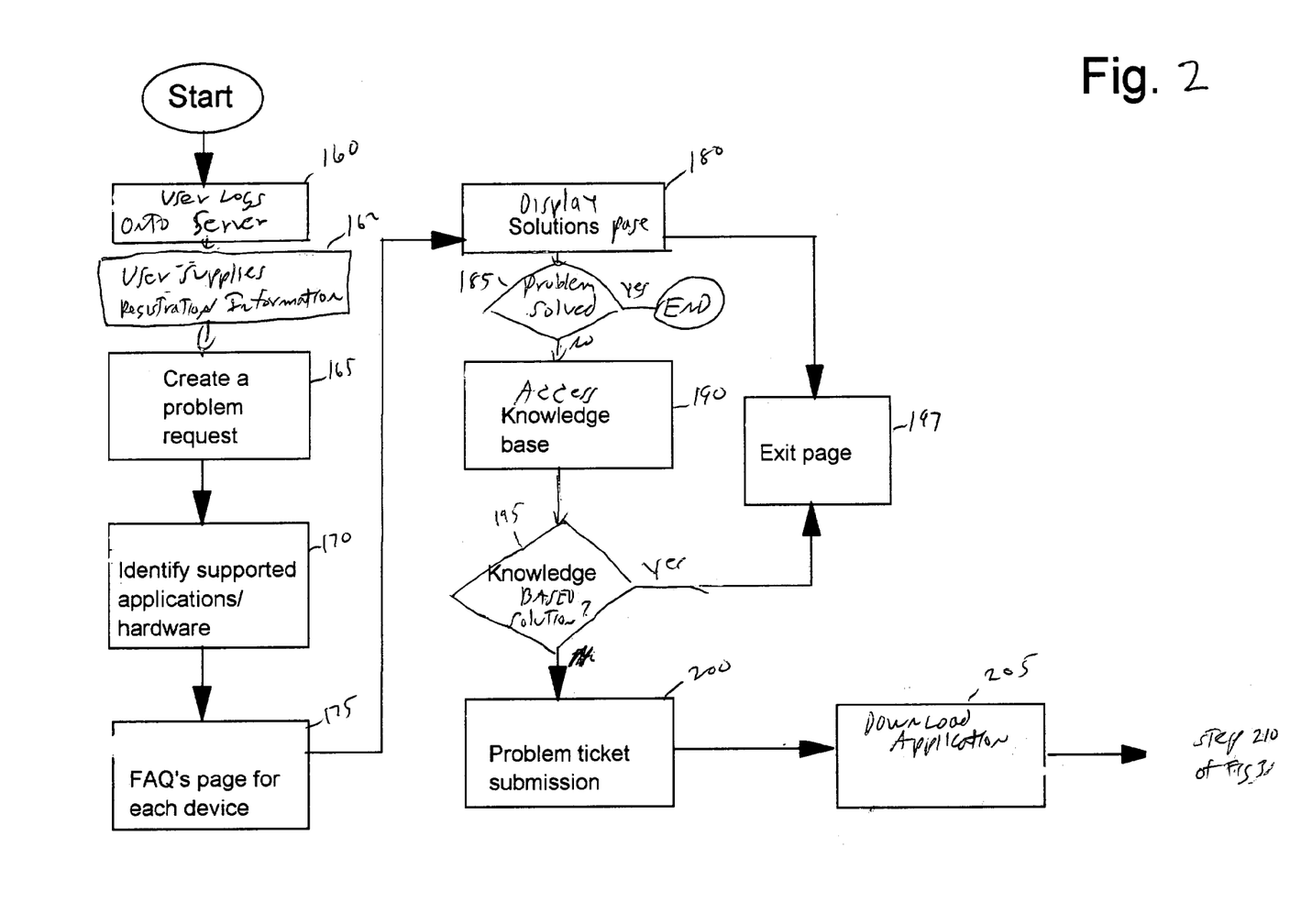
FIG. 2 is a flow chart illustrating steps taken by a user and technical support agent at their respective computers and operation of a server in accordance with the present invention.

FIG. 2 is a flowchart illustrating the steps a user may follow to submit a problem submission ticket in accordance with the present invention. When a user needs technical support, the user launches the user's web browser to access the website of the technical support system (i.e. by typing in a Uniform Resource Locator (URL) or clicking on a book marked link). Once the web page of the technical support system appears on the user's web browser, the user can log onto the web server 130 by entering a user name and password (step 160). Communication between the user device 100 and the web server 130, and between the agent device 145 and the web server 130 is via HTTPS protocol using the default configuration used by web browsers. These configuration settings allow a user to log onto the technical support system and take advantage of the full functionality of the technical support system i.e. with no alteration to the standard configuration found in the user's web browser. To stop unauthorized people from hacking into the technical support system, a connection between the user device 100 and the agent device 145 uses a unique key. The unique key is issued by the mutually trusted server 135. The mutually trusted server 135 uses cryptography to provide security and integrity to the technical support system. Cryptography is the process of encoding a message to hide the content of the message. Modern cryptography includes several secure algorithms for encrypting and decrypting messages which are based on the concept of unique keys. A cryptographic key is a parameter used in encryption algorithms such that the encryption cannot be reversed without the knowledge of the unique key. Next, the user device supplies to the server 130 registration information such as user name, password, department, email address, etc. (step 162). The server 130 forwards the registration information to the agent device 145. Then, the agent device 145 assigns a "privilege" role to the user of the user device 100. The role assigned to each user allows the user to carry out a particular set of activities for example to be able to request help from an agent and to view help web pages. (Alternately, a user ID can be created in which the user is designated as an agent. In such a case, the technical support agent will be assigned a different set of privilege rights, such as for example, to view the user device, view another user's personal details and view a user's screen.)

Next, the user initiates a problem request on the technical support web page (step 165). Then, server 130 presents the user with another web page that asks the user to identify the application with which the user is experiencing a problem (step 170). Once the application has been identified, server 130 presents a series of follow-up questions to the user (step 175). Many of these questions pertain to typically experienced problems with that application, such as, "why does my start menu keep disappearing?" The user has the option to select one of the questions that most suits the user's problem. When a question is selected, server 130 responds user with a series of automated solutions, tutorials or step by step instructions on how to solve the problem (step 180). If the problem has not been solved (decision 185), the user can access a knowledge system (step 190). The knowledge system comprises a knowledge engine and a knowledge base. The knowledge engine is able to access and apply the knowledge base to find a solution. Preferably, the knowledge base is stored separate from the knowledge engine to facilitate update to the knowledge base. However, it is also possible to embed the knowledge base within the knowledge engine such as by using Microsoft's Visual C++ language. Both types of knowledge systems can be built using a variety of techniques which include neural networks, rule based expert systems and relational databases. The knowledge system allows a user to type a query into an input box in a natural language. The knowledge engine extracts the words from the sentence and creates a pattern which is passed into the inference engine. This creates the input pattern which is used to search the knowledge base for the required information. If the knowledge engine can locate a potential solution to the user's question, the potential solution is presented to the user. If the user is satisfied with the solution (decision 195), the user will exit the application (step 197). However, if the user still requires assistance, the user can create and submit a problem ticket (step 200). The problem ticket comprises ticket number, user id, date, time, problem description and resolution history including the agents involved in solving the user's problem and the steps taken by the agents to resolve the problem.

Once the user has submitted a problem request, a software application is downloaded to the user device 100 to enable the user to access the desktop guidance application (step 205). A software agent from the software application runs on the user device to gather information on the system settings, such as the make and model of the user device, type and version number of the operating system, hardware installed, network settings, interrupt settings and other software applications installed on the client device. This information is forwarded to the mutually trusted server 135 where it is held in a system summary file that the agent can access when responding to a problem request ticket.

Figure 3:
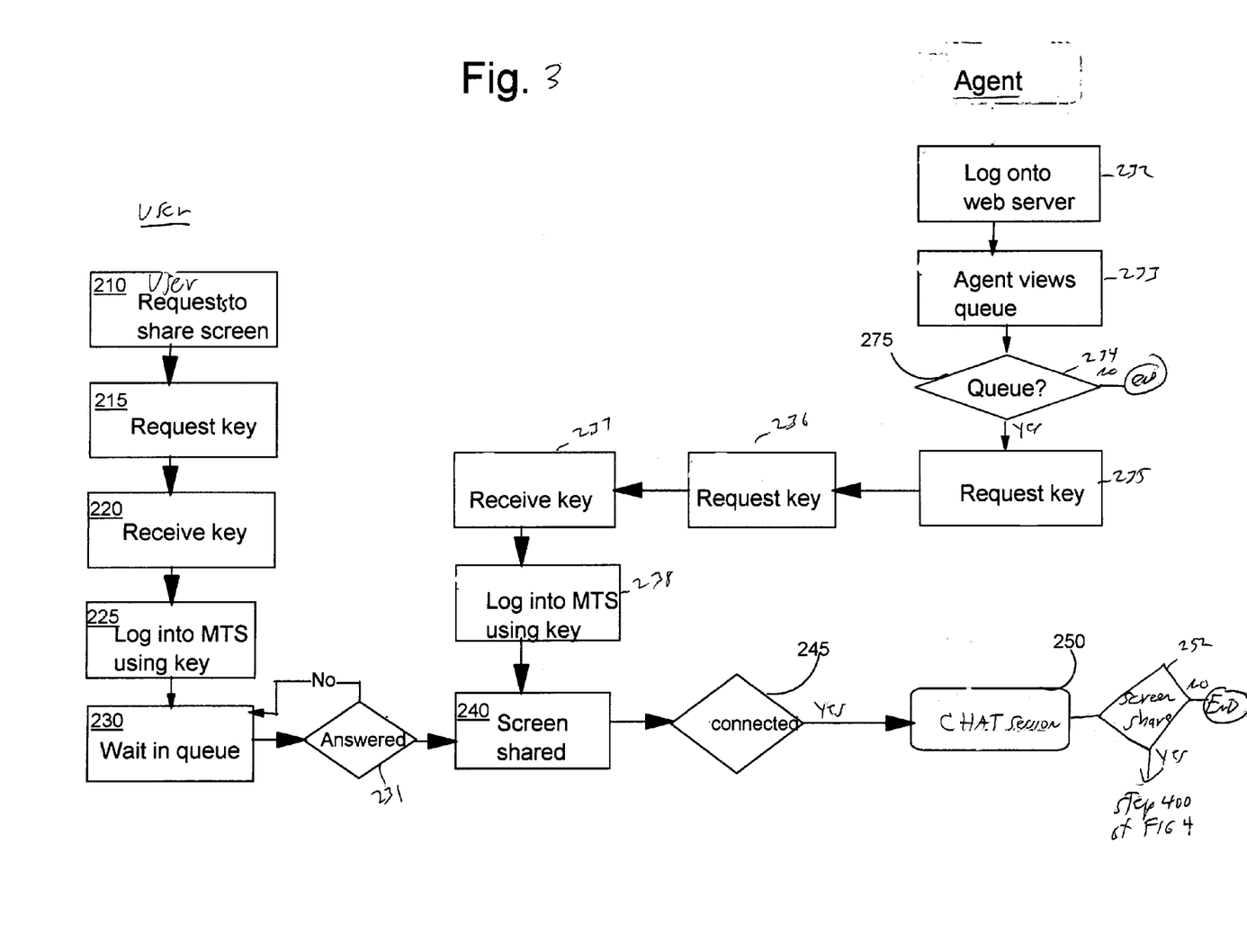
FIG. 3 is a flowchart illustrating the steps a user follows to submit a problem submission ticket in accordance with the present invention.

After the user submits a problem ticket, the user requests that the user's screen of the user device 100 be shared with the agent (step 210 of FIG. 3). This warrants additional security. Thus, the user device 100 requests a cryptographic key from the web server 130 via SSL on IP port 4356. (This request is made via network 110, router 115 or 120, LAN 125 and firewall or router 126.) The web server 130 requests the key from the mutually trusted server 135 at step 215. The keys are issued by the mutually trusted server 135 to the web server 130 only after both servers have identified themselves to each other. (The keys are randomly generated as required during the duration of each session between the user device 100 and the agent device 145. When the user device 100 and agent device 145 subsequently disconnect from communication with each other at step 245 and 250, the keys that were randomly generated within that session are disregarded.) The mutually trusted server 135 issues the key to the web server 130, and the key is passed back to the user device 100 (step 220). Then, the user device 100 logs the user onto the mutually trusted server 135 using the key received (step 225).

Next, the user device 100 waits in the queue for an agent to become free (step 230 and decision 235). The agent previously logged onto or subsequently logs onto the web server 135 using the agent's ID and password (step 232). As an additional security feature, the agent can only log onto the technical support system using a client certificate installed on the agent device 145. A client certificate is a document containing a statement signed by an agent to identify the agent. Without the correct certificate installed on the agent device 145, the mutually trusted server 135 will not display the agent login screen on the agent device and therefore, will not accept log on from the agent. Next, the agent views the problem submission ticket queue (step 233). If there are problem submission tickets in the queue (decision 234), then the agent device 145 requests a key from the web server 130 (step 235). In response, the web server 130 requests the key from the mutually trusted server 135 (step 236). The web server 130 receives the key from the mutually trusted server 135 (step 237). Once the agent device 145 has received the key, the agent can log onto the mutually trusted server 135 (step 238) using the agent's ID and password, and see the screen of the user device 100 (step 240).

The screen of the user device may be a different size than the screen of the agent device and vice versa. To overcome this problem the screen of the user device is scaled to fit the screen of the agent device, as described below. To permit the scaling, each time the user device sends an update to the mutually trusted server it also sends information on the screen size of the user device. The screen of the agent device is then scaled accordingly. If the user changes its screen size while the agent is communicating with the user, on the next update that the user device sends to the mutually trusted server, the user device sends its screen size as well. (This is sent as a header in a file along with the screen updates). In the example above where the user changes its screen size while communicating with the agent device, once the agent device has received the update, the screen of the agent's device will be scaled accordingly. The screen size is continually being sent backwards and forwards from the user device and the agent device to the mutually trusted server every time the user device and the agent device contact the mutually trusted server.

Assuming the user device is still connected (decision 245), the following interaction occurs between the user and the agent. After reviewing the information logged by the user in the problem submission ticket and the system summary file, the agent can initiate a chat session with the user of the user device 100 (step 250). The chat session comprises a two pane application window launched on the agent device and the user device. Because the agent already knows the problem that the user has reported via the problem support submission ticket and the system summary file, the agent 145 is able to quickly respond to the user. The upper pane of the application window displays the messages for example, Agent:agent 'Hello this is the HelpCentre—can I show you how to change the interrupt setting for your CD ROM drive', User: 'Yes please I do not know how to access the interrupt settings or change it to different setting'. Agent: 'can I ask you to share your screen with me please—I will put an iconic representation of a mouse and cross hair cursor on your desktop. Each time you see the iconic representation of a mouse and cross hair cursor please click once or twice with the left or right mouse depending what the iconic representation of the mouse and cross hair cursor is showing you'. The lower pane allows the input of text which formulates the chat session. The two pane application window further comprises a button which allows the user to click to enable sharing of the user screen with the agent device 145.

Figure 4:
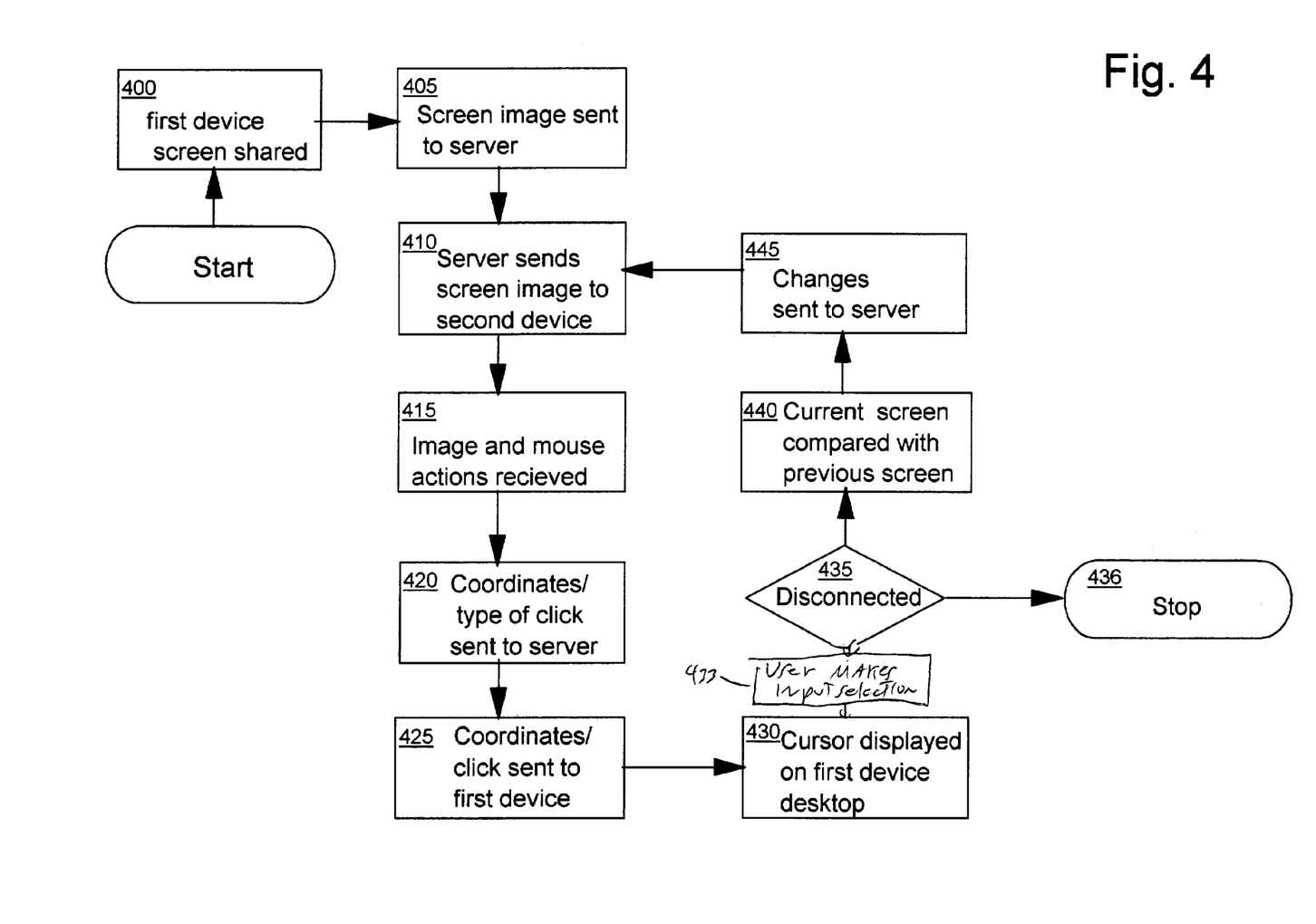
FIG. 4 is a flowchart illustrating how an input icon is defined and the definition sent to the user's computer in accordance with the present invention.

Such a request for a screen share will lead to the steps of FIG. 4 (step 400). Consequently, the user's screen (that is currently displayed on user device 100) is scaled to fit the agent computer screen, and sent to the mutually trusted server 135 (step 405). The scaling is based on the difference in pixels used for both screens. For example, if the user screen is 640×480 (X×Y) pixels and the agent screen is 320×480 (X×Y) pixels, the user device will only send every other pixel in the X axis to achieve scaling of the screen image. Conversely, if the user screen is 320×480 and the agent screen is 640×480 pixels, the user device will send every pixel twice in the X axis to fill up the agent screen. The server 135 sends the screen to the agent device 145 (step 410). Then, using the agent's mouse, the agent moves the agent's cursor to the proper location on the user's screen as it appears on the agent device. This location is translated into x and y coordinates to indicate where the input icon is to appear on the user screen at the user device 100. Then, the agent makes the proper selection within the user's screen as it appears on the agent device by clicking the proper mouse button the proper number of times (step 415). This action is also recorded at the agent device. If the screen size of the user device differs from that of the agent device, the agent device will scale the cursor location to fit the screen of the USER device. The scaling is achieved by geometric transformation performed on the agent device. For example, the user screen is 640×480 pixels and the agent screen is 320×240 pixels. When the agent device needs to send to the user device the coordinates of the input icon, the agent device will multiply the x and y coordinate pixel counts as they appear on the agent device by 2 before sending them to the user device. The agent device then sends to the trusted server 135 the SCALED, x and y coordinates of the cursor together with the mouse selection data detailing which mouse input button to click and how many times a user should click the MOUSE input button (step 420). The agent device also includes an indication of the type of input icon to display at the user device. Server 135 then forwards to the user device the x and y coordinates of the cursor together with the input icon type and mouse selection data (step 425). The input icon is then displayed on the screen of the user device accordingly.

Figure 5:
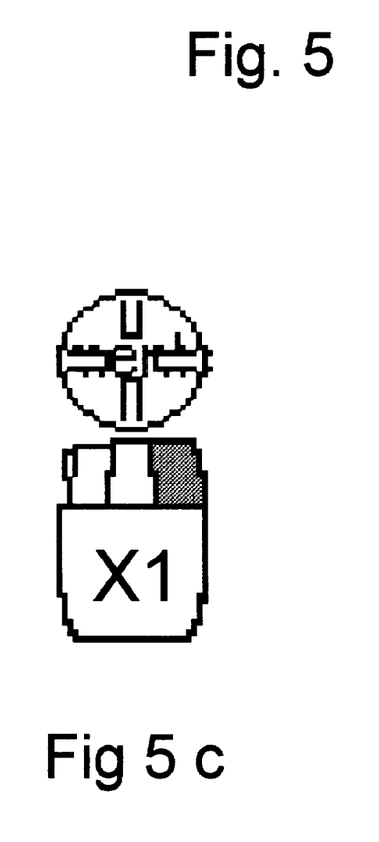
FIGS. 5a, 5b and 5c illustrate the input icon of FIG. 4.

Referring to FIGS. 5a, 5b and 5c, in a personal computing environment it is common to use a mouse as an input device for making selections (as well as drag and drop movements) from a display screen. A mouse usually has three buttons as shown in FIGS. 5a, 5b and 5c. To illustrate to the user of the user device 100 that the user should select the left mouse button, the left mouse button is given a different color or highlighted. At the same time in the body of the mouse the characters X1 or X2 are displayed to illustrate to the user the number of times, one or two, respectively, that the left mouse button should be selected. In the illustrated example of FIG. 5a, X1 is indicated. Similarly as shown in FIG. 5b, if the agent requires the user of the user device 100 to select the left mouse button and click it twice, the left mouse button is highlighted and the characters X2 appear in the body of the mouse. Finally if the agent requires the user of the user device 100 to select the right mouse button once as illustrated in FIG. 5c, the right mouse button is highlighted and the characters X1 will appear in the body of the mouse. However, other input icons could be indicated as well. For example if the user device is a mobile phone, the input icon can be a mobile phone key pad. It will highlight a relevant key to illustrate which key or keys to select to achieve a particular task i.e. configuring the mobile phone's service setting to WAP (Wireless Application Protocol) enable the mobile phone. If the device is a PDA, the input icon can be a wand. The software application running on the user device 100 uses the indication/data as to the type of input icon as an index into a list of input icons such as a mouse and cross hair cursor or any other input device. Then, the software draws the appropriate input icon on the screen of the user device at the specified coordinate x and coordinate y.

Referring back to FIG. 4, next the user makes an input selection to the user's screen, preferably that recommended by the input icon (step 433). Then, the user device performs a check to ensure that both the user device 100 and the agent device 145 are still connected to the system (step 435). If both devices are still connected, the user device compares its current screen image to the previous screen image of the user device that was sent to the mutually trusted server 135 in step 405 (step 440). The current screen image is rendered and scaled to the size of the screen of the agent device. By allowing the user device to render and scale the screen images, it is only necessary to send to the server 135 the changes between the previous screen image and the current screen image. If the current screen image has changed from the previous screen image, the changes are sent to the mutually trusted server 135 (step 445). Such changes will have occurred if, for example, the user has entered the selection recommended by the input icon. Steps 410 to 445 are continued until all the input selections that are required to be performed by the user to operate or fix the user's application are completed.

The are several advantages of the present invention. The user is in complete control of the user's application, deciding whether or not to accept the input selections recommended by the input icon/agent. The agent via the input icons is able to guide the user to perform a series of corrective actions. Language barriers between the agent and the user are avoided. Also, the input icons can be positioned anywhere on the desktop and not just within an application window that has been launched for that purpose.

Figure 6:
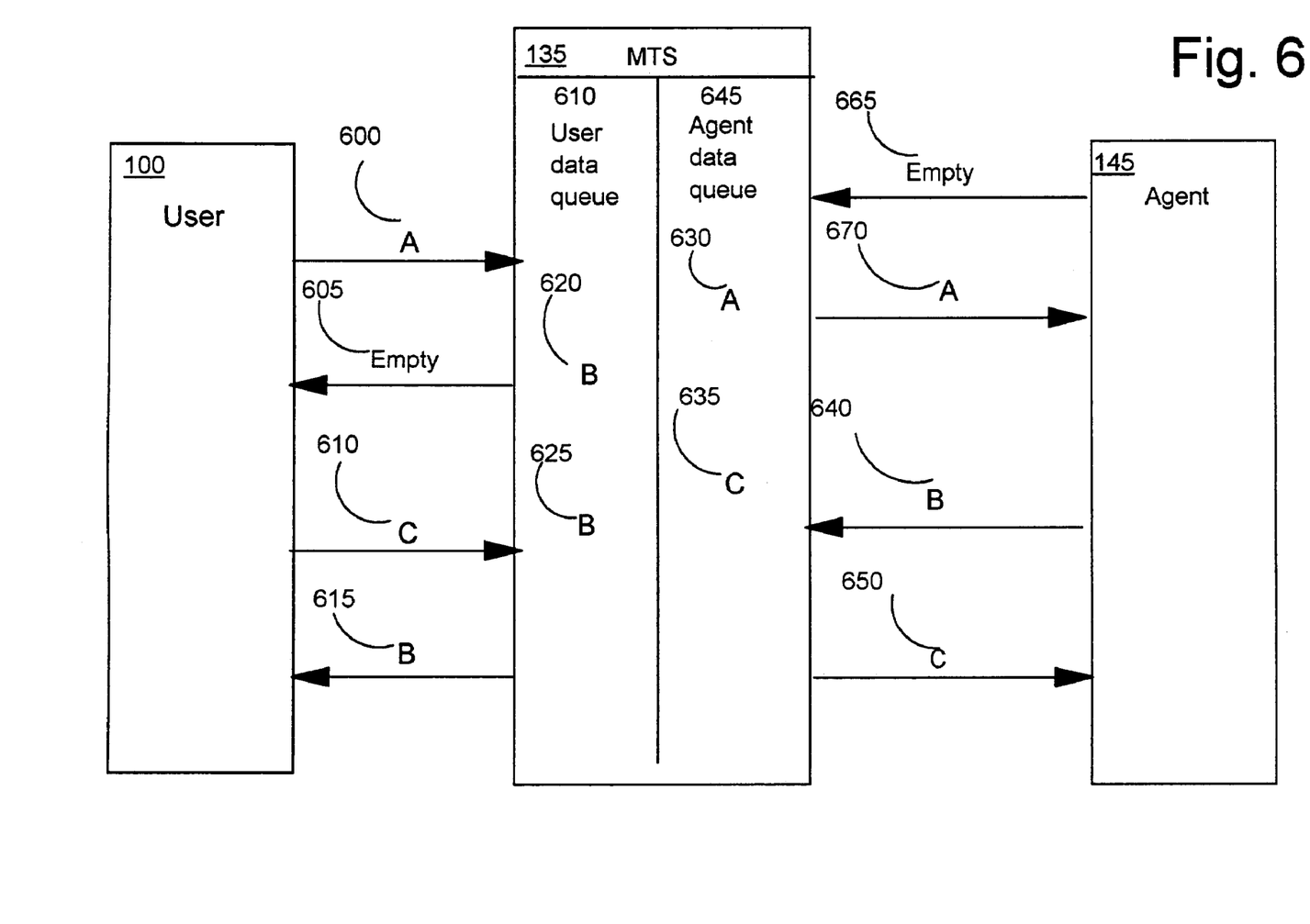
FIG. 6 is a block diagram illustrating interaction between a user computer, a mutually trusted server and a technical support agent computer in accordance with the present invention.

Details of the data exchange between the user device 100, the mutually trusted server 135 and the agent device 140 are further explained with reference to FIG. 6. The mutually trusted server (MTS) 135 comprises two data queues, a user data queue 610 and an agent data queue 645. The user data queue 610 comprises data packets sent from the agent device 145 when a change is made to a current screen image. The agent data queue 645 comprises data packets sent from the user device 100 once the user has made a change to the user's current screen image, for example, by making a selection suggested by the agent. On the first interaction with the mutually trusted server 135, the data packet comprising the screen image of the user device and the input icon data 600 is sent to the mutually trusted server 135. The data packet 630 is stored in the agent's data queue 645. For every request that the user device 100 sends to the mutually trusted server 135, the user device 100 will wait for a reply. The reply in this example for data packet 630 sent via request 600 is a reply data packet 655 sent from the agent device 145 to the mutually trusted server (MTS) 135 and sent to the user device in reply 605. In this example, the reply data packet is empty because the agent device 145 does not have any changes to send back to the mutually trusted server (MTS) 135.

In another example, the user device 100 sends a request data packet 610 to the mutually trusted server (MTS) 135. The request data packet 635 is stored in the agent data queue 645 until the agent device 145 initiates a request 650 to the mutually trusted server 135 (MTS) to send a request data packet to the agent device 145. Once the agent device 135 receives the request data packet, the agent is able to view the changes that the user has made to the user's screen of the user device. The agent can determine which further steps are required for the user to perform to solve the reported problem.

Once the agent has determined the position and type of instruction that the input icon to be displayed on the screen of the user device 100, the reply data packet comprising the changes 640 are sent back to the mutually trusted server (MTS) 135. The reply data packet 625 is stored on the user data queue 610. Meanwhile the agent device waits for further updates to be sent from the mutually trusted server (MTS) 135. The mutually trusted server (MTS) 135 sends a reply to the request data packet in the form of reply data packet 615. Thus, the user device and the agent device form a pair. Within the technical support system there can be a plurality of user device and agent device pairs. The mutually trusted server acts like a switchboard receiving requests and sending replies to and from the appropriate user device and agent pairs.

The present invention is preferably embodied as a computer program product for use with a computer system. Such an implementation may comprise a series of computer readable instructions fixed on a tangible medium, such as a computer readable media, e.g., diskette, CD-ROM, ROM, or hard disk. Alternately, the computer program product may be transmittable to a computer system, via a modem or other interface device, via a tangible medium, such as optical or analog communications lines, or intangibly using wireless techniques such as microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

Alternate embodiments of the present invention are also contemplated. For example, the present invention can utilize a command line interface with the ability of the agent to type in command line instructions for the user computer and the output displayed on the user's computer. The user would be provided with the option whether or not a particular command should be executed. Also, instead the user device sending only the changes to the agent device (via the server), the user device can send the entire user screen. While this will increase the amount of data that is communicated, it will simplify the computations performed at the user device to identify and isolate the changes. Therefore, the scope of the present invention is determined by the following claims.

The invention claimed is:

1. A computer program product, recorded on a machine-readable medium for supporting a user of a first device coupled to a second device of a support agent, the program product comprising:

first program instructions for execution at said first device to send a current screen image of the first device to said second device;

second program instructions for execution at said second device to display at said second device the current screen image of the first device;

third program instructions for execution at said second device to determine the position of an input icon to be displayed on said current screen image, and said position being sent to said first device; and fourth program instructions for execution at said first device to initiate display of an input icon on the current screen image on the first device based on said position; and wherein said first, second, third and fourth program instructions are recorded on said medium.

* * * * *